United States Patent [19]

Merk et al.

[11] Patent Number: 4,565,480
[45] Date of Patent: Jan. 21, 1986

[54] CAROUSEL PALLET SHUTTLE

[75] Inventors: Edward Merk, Long Beach; George Delaney, Laguna Hills; Leon Wasynczuk, Torrance; Richard Parks, Mission Viejo; Richard Polacek, Palos Verdes, all of Calif.

[73] Assignee: Burgmaster - Houdaille, Inc., Los Angeles, Calif.

[21] Appl. No.: 415,548

[22] Filed: Sep. 7, 1982

[51] Int. Cl.[4] .............................................. B65H 5/18
[52] U.S. Cl. ................................. 414/225; 198/465.1; 414/749; 414/751
[58] Field of Search ............... 414/222, 223, 749, 750, 414/225, 751; 198/345, 472, 487; 29/33 P, 563

[56] References Cited
U.S. PATENT DOCUMENTS

| 3,730,364 | 5/1973 | Nakamura et al. | 414/222 |
| 3,825,245 | 7/1974 | Osburn et al. | 29/563 X |
| 4,326,624 | 4/1982 | Ewertowski et al. | 198/472 X |
| 4,373,840 | 2/1983 | Miller, Jr. | 414/225 |

Primary Examiner—Robert J. Spar
Assistant Examiner—Donald W. Underwood
Attorney, Agent, or Firm—Hill, Van Santen, Steadman & Simpson

[57] ABSTRACT

A pallet shuttle system for loading and unloading pallets from a plurality of pallet storage locations oriented in a circular arrangement, incorporates a centrally located rotatable support member, with a movable pallet shuttle thereon, the pallet shuttle having a latch adapted to releasably connect a pallet to the pallet shuttle member, and a lost motion linkage for automatically engaging and disengaging the latch when the pallet has been moved from or to one of its storage positions.

9 Claims, 9 Drawing Figures

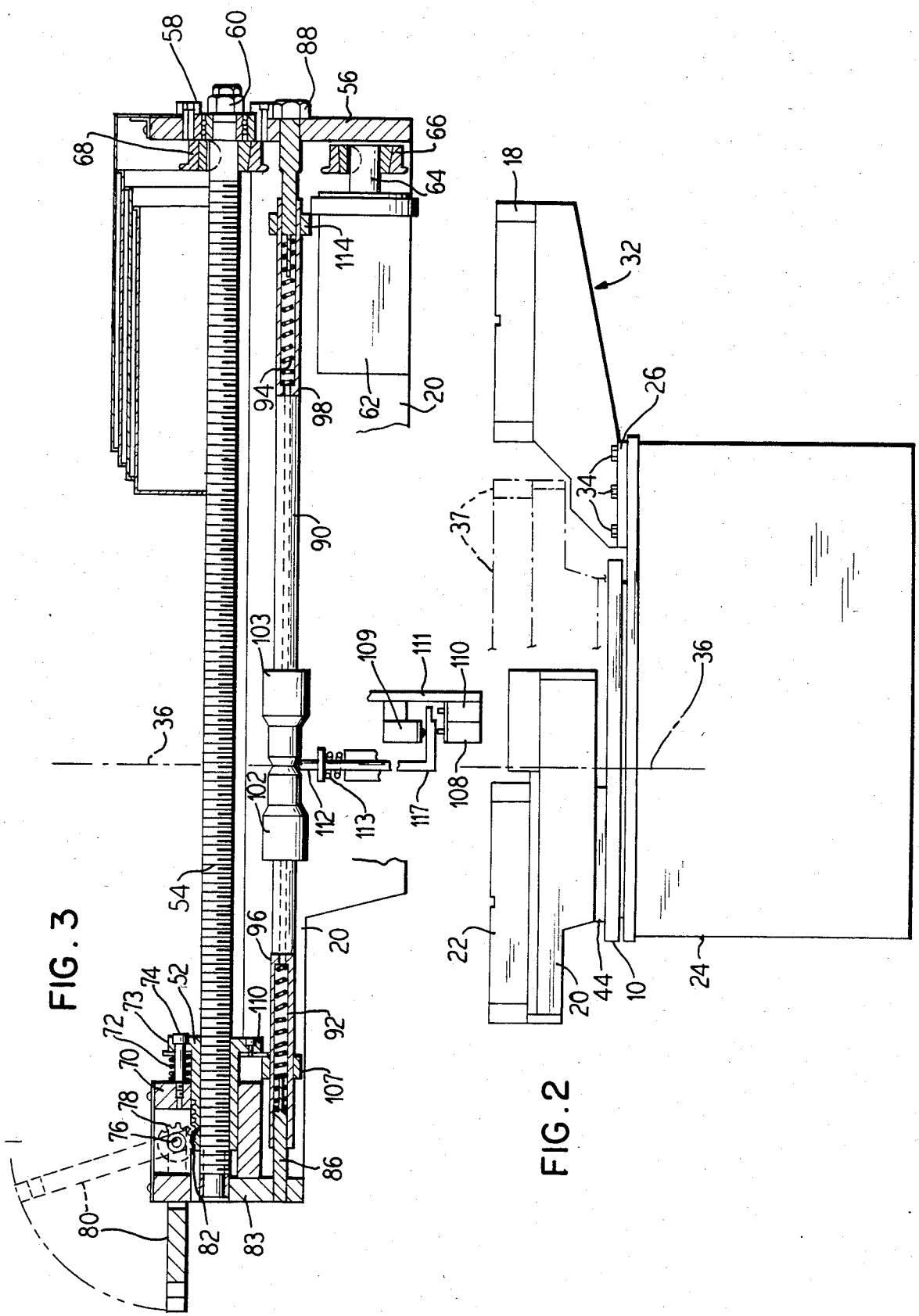

CAROUSEL PALLET SHUTTLE

BACKGROUND OF THE INVENTION

1. Field of the Invention

The present invention relates to a pallet shuttle for loading and unloading pallets from the table or bed of a machine tool, and more particularly to such a shuttle which is adapted for cooperation with a plurality of pallet storage positions located in a circular arrangement.

2. The Prior Art

Efforts to achieve maximum efficiency in the use of machine tools such as machine centers and the like, have resulted in the development of a variety of pallet shuttle mechanisms, in which pallet storage positions are located in a variety of positions. In all of these arrangements, some mechanism is provided for shifting a pallet from a storage position to a working position on the table of the machine tool, and for later returning the pallet to an assigned storage position. Most of the attempts in the prior art to develop such systems involve units of relatively great complexity, and the necessity for sequencing various actions of the apparatus so that the various steps necessary to be performed during the loading or unloading operation occur in the proper sequence.

It is desirable to provide a power handling mechanism which is relatively simple, and economically manufactured, and which readily performs a number of functions in sequence, so that they may not be accidentally performed in the wrong sequence.

BRIEF DESCRIPTION OF THE INVENTION

It is a principal object of the present invention to provide a simple and economical pallet shuttle mechanism, especially designed for a carousel, for cooperating with a number of pallet storage positions located in a circular arrangement. This shuttle mechanism incorporates a drive screw, and a drive screw nut which is movable rectilinearly in response to rotation of the screw. Means is provided for automatically locking or unlocking the drive screw nut to a pallet, whereby the pallet may be moved rectilinearly from the storage position to a rotating position, and, after subsequent rotation of the index table unit, moved to a machine tool operating position by further rectilinear motion of the drive screw. Locking and unlocking is accomplished automatically in response to the drive screw nut approaching or being retracted from an end position. A plurality of limit switches are operated by a single limit switch actuator for limiting movement of the drive screw nut in either direction, and for sensing when the drive screw nut first approaches and then reaches either of its extreme end positions. The result is a simple and economical means for handling pallets reliably by rectilinear motion to and from the rotatable index table, with automatic locking and unlocking means, and with a simple and effective means for determining when the maximum feed speed of the drive screw should be limited and stopped.

Other objects and advantages of the present invention will become manifest by an examination of the accompanying drawings.

BRIEF DESCRIPTION OF THE DRAWINGS

Reference will now be made to the accompanying drawings in which:

FIG. 2 is a side elevational view of the apparatus of FIG. 1;

FIG. 3 is a side elevational view, partly in cross-section, of the pallet shuttle;

DESCRIPTION OF THE PREFERRED EMBODIMENTS

Figure 1:
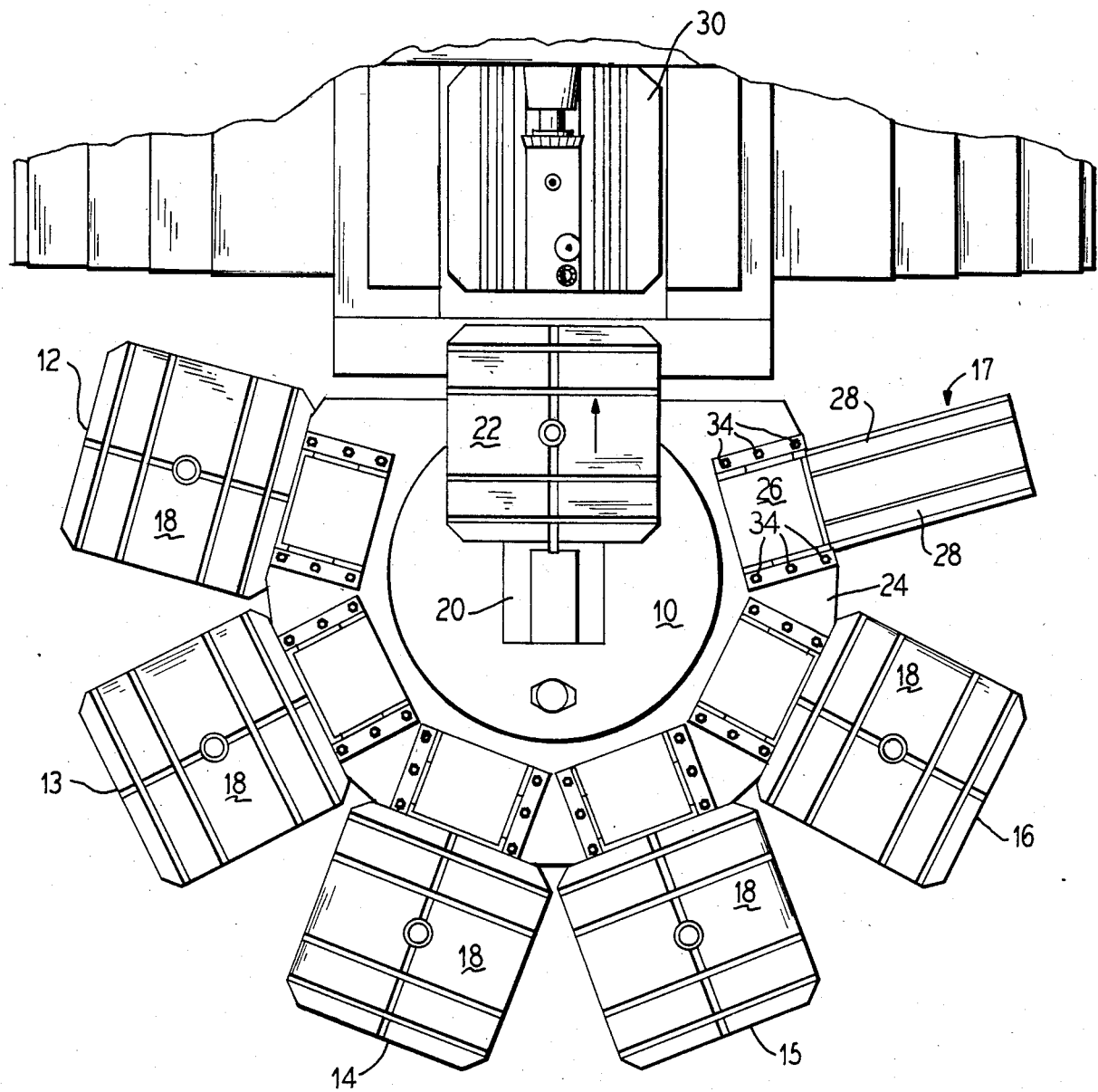
FIG. 1 is a plan view of a carousel shuttle assembly incorporating an illustrative embodiment of the present invention.

Referring now to FIG. 1, a plan view of a carousel pallet shuttle is illustrated, in which a rotating index table 10 is provided, surrounded by a plurality of pallet storage locations 12-17. A pallet 18 is located at each of the pallet storage locations, except for the storage location 17, which is empty. The index table 10 supports a rotating pallet shuttle 20, and a further pallet 22 is illustrated in FIG. 1 as mounted on the rotating pallet shuttle 20.

Each of the pallet storage units 12-17 incorporates a unit bolted to a circular base plate 24 which surrounds the index table 10. In the case of the pallet storage location 17, a bracket 26 is bolted to the base 24, and a pair of ways 28 are secured to the bracket 26 for temporarily supporting a pallet such as the pallet 22. The pallet is adapted to be transferred from one of the storage locations 12-17 to the rotating pallet shuttle 20, which can rotate into alignment with the various pallet storage locations 12-17, and afterwards can rotate to the position illustrated in FIG. 1, so the pallet 22 can be moved radially outwardly from the rotating pallet shuttle into operating association with the machine tool 30. Machine operations are then performed on the work supported on the pallet 22, after which the pallet shuttle 20 retracts the pallet 22 from the machine tool 30, rotates to one of the pallet storage locations such as the location 17, and returns the pallet rectilinearly to a storage location.

FIG. 2 illustrates the carousel base 24, and one of the pallet storage units 32 bolted to the plate 24 by means of bolts 34. The storage unit 32 supports a pallet 18.

The index table 10 is also mounted on the base 24 for rotation about a vertical axis indicated by dashed line 36. Supported on the index table 10 is the rotating pallet shuttle 20, which is shown in FIG. 2 with a pallet in retracted position, namely nearest the axis 36. When in this position, the shuttle 20 with its pallet 22 may rotate past other storage positions, as indicated by the dashed lines 37 in FIG. 2 which show that the pallet shuttle with its pallet may be rotated past the pallet storge location supporting the pallet 18.

Figure 4:
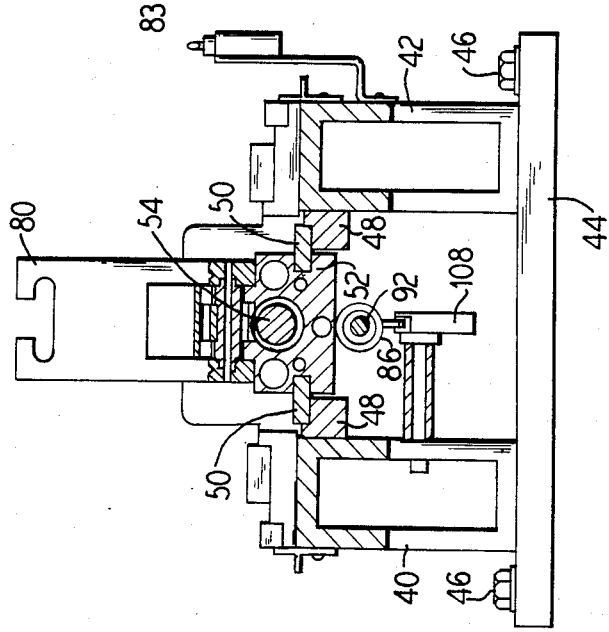
FIG. 4 is an end view, partly in cross-section, of the apparatus of FIG. 3.

Parts of the rotating pallet shuttle 20 are shown in more detail in FIGS. 3 and 4.

In FIG. 4, a pair of tubular brackets 40 and 42 are mounted on top of a base plate 44 which is adapted to be bolted to the top surface of the base member 33 by bolts 46. A pair of support members 48 are secured to each of the hollow base members 40 and 42, and a pair of ways 50 are bolted to the members 48 by bolts (not shown). A drive screw nut 52 is provided with opposing slots for receiving the ways 50, and they slide horizontally along the ways 50, in a rectilinear direction. The ways 50 cooperate with the slots to prevent the drive screw nut 52 from moving vertically or horizontally relative to the ways.

The drive screw nut is threaded to receive a drive screw 54, so that by rotation of the drive screw, the nut 52 is moved forward and backwardly along the ways 50.

A side view of the drive screw 54 is illustrated in FIG. 3.

As shown in FIG. 3, the drive screw 54 is supported at one end by an end plate 56 in a bearing 58. The shaft of the screw 54 which is received in the bearing 58 has a slightly reduced diameter, and a retainer nut 60 is threaded onto the free end of the shaft on the other side of the bearing 58, so that the screw 54 is retained in longitudinal position relative to the end wall 56. A hydraulic motor 62 has a drive shaft 64 with a sprocket 66. The shaft 54 has a cooperating sprocket 68 and a chain (not shown) interconnecting the sprocket 66 and 68 enables the drive shaft 54 to be turned by the motor 62.

The drive screw nut 52 is shown in cross-section in FIG. 3, and as illustrated, is threaded on the drive screw 54. It has a horizontal longitudinal bore for receiving the drive screw 54, and has interior threads which cooperate with the screw threads on the drive screw 54. The drive screw nut cooperates with the ways 50 as described above in connection with FIG. 4, and so is constrained for movement along the axis of the drive shaft 54 as the latter is rotated.

A gear housing 70 is mounted in sliding relationship with the drive screw nut 52, the latter being received in a horizontal bore passing through the gear housing. A spring 72 urges the housing to its leftward position as illustrated in FIG. 3, the spring 72 being trapped between the rear wall of the gear housing, and an upstanding flange 73 provided on the drive screw nut 52. A bolt 74 is threaded into the housing 70 and passes through an aperture in the flange 73. The head of the bolt limits leftward movement of the gear housing relative to the drive screw nut, and retains the spring 72 in position.

A horizontal shaft 76 is supported by the gear housing and a gear 78 is mounted on the shaft for rotation therewith. A latch 80 is fixed to the gear 78 and turns therewith. The gear 78 cooperates with a rack 82 formed in the upper surface of the left end or forward end of the drive screw nut 52, so that as the drive screw nut 52 is moved leftwardly (as shown) relative to the gear housing, the gear 78 is rotated in a clockwise direction, thereby to lift the latch 80. In operation, the latch 80 engages a hook on a pallet in the position shown in FIG. 3, and the motor 62 causes the screw 54 to rotate, and bring the drive screw nut 52 and the gear housing 70 rightwardly, thereby pulling the pallet onto the rotatable pallet shuttle. The index table is then rotated to the correct position, and the motor 62 energized in its reverse direction, whereby the drive screw nut 52 and the gear housing 70 are moved leftwardly, loading the pallet into position relative to the machine tool, or alternatively, returning it to a pallet storage position. The spring 72 is sufficiently strong to maintain the separation between the drive screw nut 52 and the gear housing 70.

When the leftwardly moving gear housing 70 reaches a fixed stop 83, further rotation by the drive screw 54 acts to compress the spring 72 and move the drive screw nut 52 leftwardly relative to the gear housing. This causes a rack 82 to engage and rotate the gear 78, thereby lifting the latch 80, and freeing the rotating pallet shuttle from the pallet tongue or key. The pallet shuttle can then rotate to the next pallet position, and when this position is reached, initial rightward movement of the drive screw nut 52 lowers the latch 80 into latching position, after which a new pallet may be pulled toward the center of the rotating shuttle.

It can be seen that the movement sequence, including latching and unlatching, is completely automatic and sequential, and does not require any limit switches, sequence controls or the like. Means are provided, however, for sensing when the drive screw nut is reaching one of its two end positions, so that the feed speed can be lowered before the moving members are finally stopped.

Projecting rearwardly from the forward wall 83 is a shaft 86, and a corresponding shaft 88 projects forwardly from the rear wall 56. A tube 90 is mounted in sliding engagement on the shafts 86 and 88, so they may slide longitudinally while being supported for such movement by the shafts 86 and 88. A spring 92 is mounted inside one end of the tube 90, with one end of the spring 92 in engagement with the outermost surface of the shaft 86, and the other end abutting an interior ledge 96 within the tube 90. A spring 94 is received in similar fashion at the other end of the tube 90, with one end engaging the free end of the shaft 88, and the other end abutting a ledge 98. The two springs 92 and 94 serve to maintain the tube 90 in a normal central position, corresponding to equal compression of the two springs 92 and 94. This is the position illustrated in FIG. 3.

Two cams 102 and 103 are mounted on the tube 90, and cooperate with switches 108–110, mounted on a bracket 111. A cam follower 112 is adapted to be operated by the cams 102 and 103 in response to shifting movement of the tube 90. The cam follower 112 is mounted in a vertical orientation below the tube 90, and is biased upwardly by a spring 113. Its lower end is attached to an actuator 117, which is adapted to deactuate switch 109 by its initial downward movement, and then actuate switch 108 by further downward movement. In the position illustrated in FIG. 3, the switch 109 is energized, indicating a generally central position of the tube 90.

A collar 107 is provided on the tube 90 near its left-hand end, and a corresponding collar 114 is provided on the tube 90 near its right-hand end. The collar 107 is adapted to engage a depending portion 119 of the drive screw nut 52, so that leftward movement of the drive screw nut from the position shown in FIG. 3 carries the collar 107 and the tube 90 leftwardly, as the spring 72 is compressed. This movement of the shaft 90 causes the switch 109 to first be deactuated, by virtue of the cam 103 moving relative to the cam follower 112, forcing it downwardly. The signal produced by the switch 109 can be used to slow the feed speed of the motor 62, preparatory to stopping the parts. Further leftward movement of the drive screw nut 52 continues to carry the tube 90 leftwardly, until the higher part of the cam 103 forces the cam follower 112 further downward, causing the actuator 117 to operate the switch 108. The switch 108 is operated when the latch 80 has been lifted through an angle of about 70° or 80°. The signal from the switch 108 can be used to stop the motor 62 when the latch 80 has been lifted sufficiently to clear the tongue or key of the pallet.

When a pallet is being loaded onto the rotating pallet shuttle, the drive screw 52 moves rightwardly, thereby lowering the latch 80 into position, and the tube 90 also moves rightwardly, in response to the force of the spring 92. The switch 108 becomes unactuated immediately upon rightward movement of the shaft 90, and the switch 109 becomes actuated when the shaft 90 reaches the position shown in FIG. 3, with the latch 80 lowered to latching position as shown. The deenergization of the switch 109 supplies a signal which can increase the feed speed of the motor 62, so that the pallet may be rapidly loaded onto the rotating carousel. Further rightward movement of the pallet brings the depending portion 119 of the drive screw nut 52 into conjunction with the collar 114, and moves the tube 90 rightwardly, first deactuating the switch 109, as the follower moves off of cam 103 and ultimately actuating the switches 108 and 110 via cam 102 and follower 112, when the drive feed screw 52 approaches and reaches its extreme right position. The signal from the switch 109 can be used to reduce the feed speed, preparatory to stopping the motor 62 the instant at which the switch 110 becomes actuated. The signal from the switch 108 is not used in this mode of operation. The switch 110 is not operated during leftward movement because of the reduced size of the cam 103 relative to the cam 102. It is apparent from FIG. 3 that these functions can take place with only three limit switches 108-110 all mounted close to each other, which simplifies the electrical wiring of the apparatus.

Figure 5:
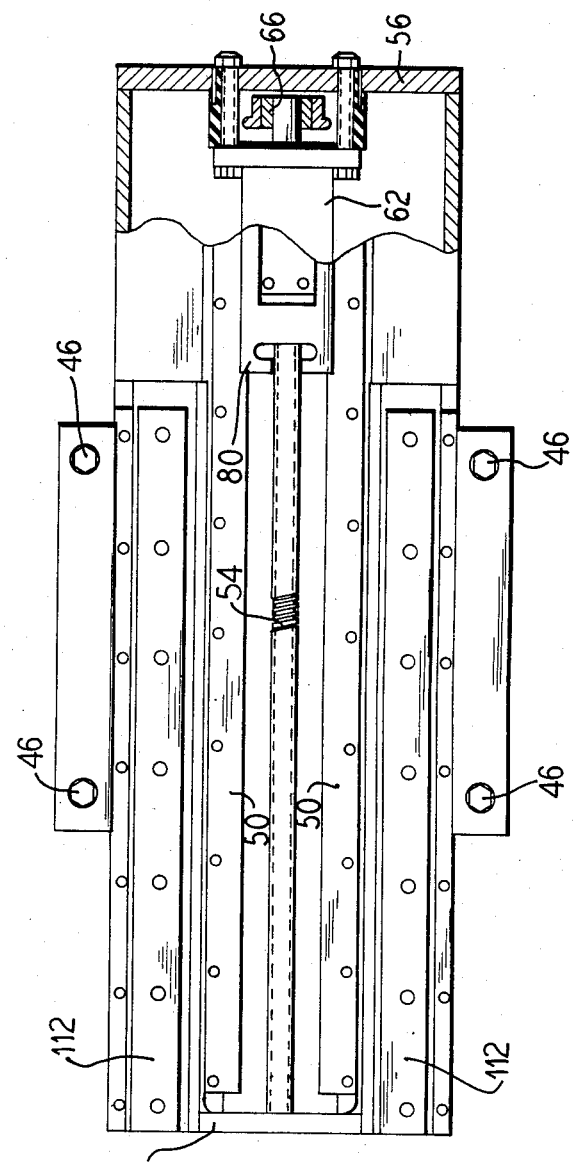
FIG. 5 is a plan view of the apparatus of FIGS. 3 and 4.

FIG. 5 is a plan view of the apparatus illustrated in FIGS. 3 and 4, showing the latch 80 in lowered or latching position. The ways 50 supports the sliding movement of the drive screw nut 52 and the ways 112 are provided for accommodating the sliding movement of the pallet onto the rotating pallet shuttle.

Figure 7:
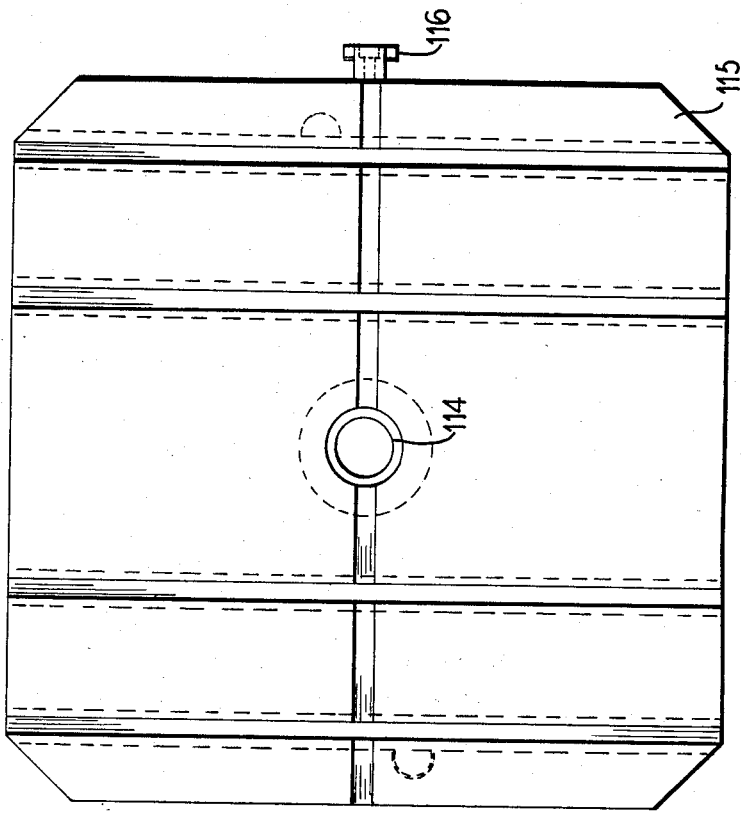
FIG. 7 is a plan view of a pallet.
Figure 6:
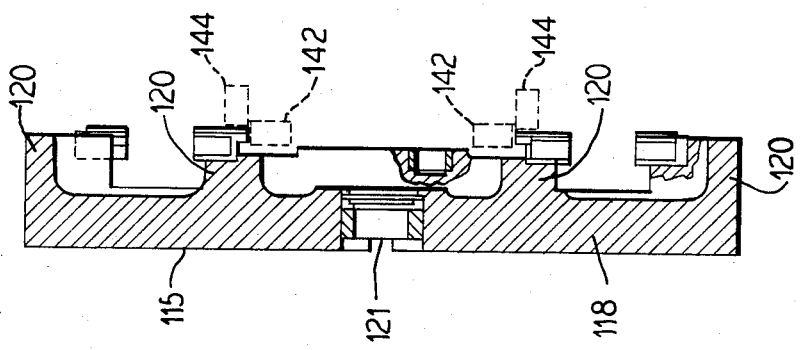
FIG. 6 is a vertical cross-section of a pallet assembly used in connection with the apparatus of FIGS. 2-5.

FIG. 6 illustrates a vertical cross-section through the center of the pallet 115, and FIG. 7 shos its plan view. The pallet has a central bushing 121 with a vertical aperture, which is adapted to permit precise location of parts relative to the central position of the axis. A hook or tongue member 116 projects from one end of the pallet, and is located a precise distance from the center of the bushing 121, so that the pats which are located relative to bushing 121, may also be located relative to the tongue 116.

The horizontal upper surface of the pallet has a relatively thick wall 118, and is further strengthened by downwardly depending ribs 120, which run along the bottom for the length of the pallet. The two intermediate ribs 120 are provided with surfaces for engaging the ways 112 of the rotating pallet shuttle, so that the vertical position of parts located on the pallet 115 is also known with precision.

Figure 9:
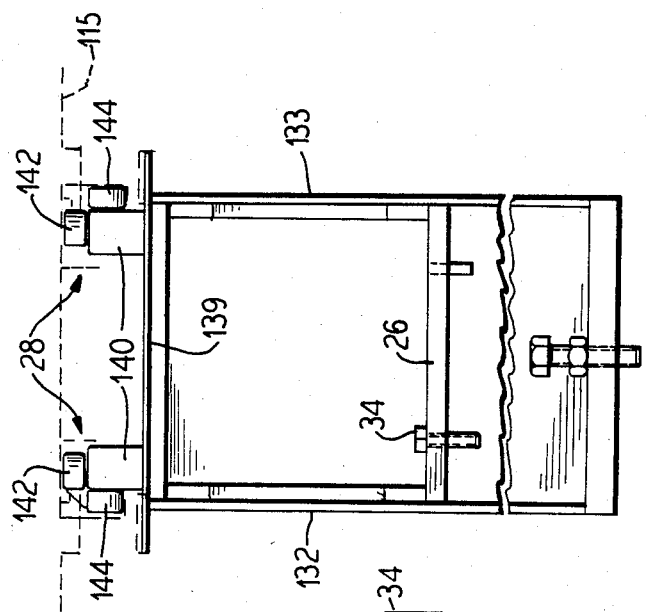
FIG. 9 is an end elevational view of the wing assembly of FIG. 8.
Figure 8:
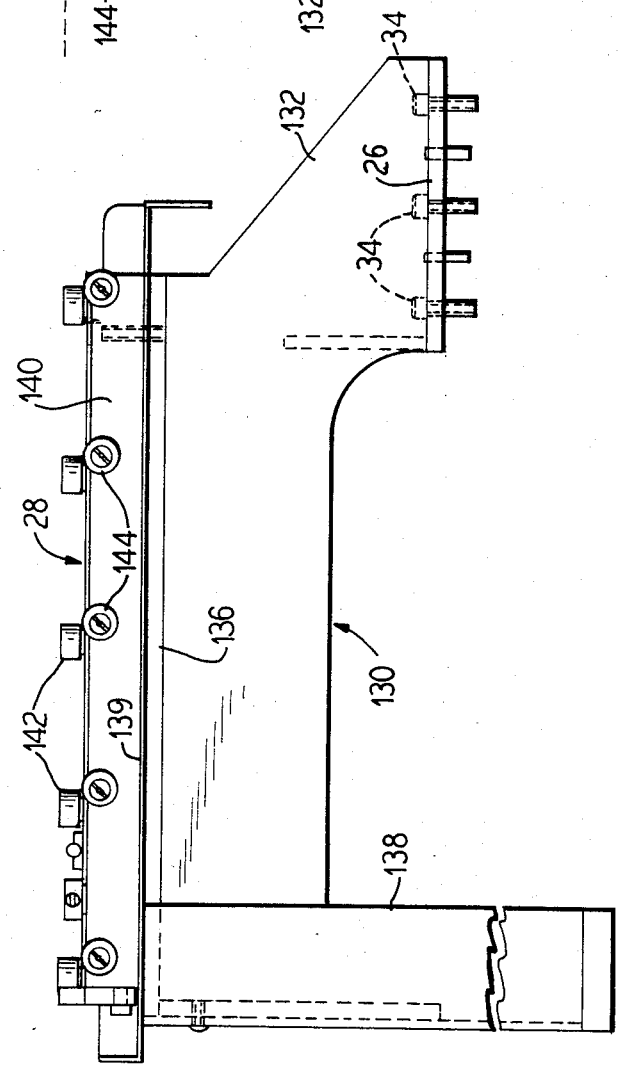
FIG. 8 is a side elevational view of a wing assembly comprising a pallet storage location.

FIGS. 8 and 9 illustrate the side and end elevations of an extension wing 130 which forms one of the pallet storage stations. The wing 130 is composed of a pair of side walls 132 and 133, bottom wall 26 and a top wall 136 secured by welding or the like to the side walls 132. The bottom wall 26 is bolted by the bolts 34 to the support 33 (FIG. 2), at one end of the upper wall 136, and the other end of the upper wall, as well as the side walls 132 and 133, is supported by a support member 138, the lower end of which rests on the floor or other support member. A drip pan 139 covers the upper surface of the top wall 136, and the ways 28 are supported by the upper wall 136, above the drip pan 139. The ways include a pair of rails 140, and a pluraltiy of rollers 142 are mounted on the upper surface of the rails 140, and a further pluraltiy of rollers 144 are mounted on the outside horizontal surfaces of the rails 140. The rollers 142 and 144 guide the movement of the pallet 115, so that it is allowed to move in a rectilinear direction when the hook or tongue 116 is pulled forward by the rotating pallet shuttle. Each of the rollers 142 and 144 is mounted on a shaft, so that it can rotate relative to the rails 140 on which it is mounted.

From the foregoing, the apparatus of the present invention has been described in terms of a preferred embodiment. It will be apparent to those skilled in the art that various modifications and additions may be made in the apparatus of this invention without departing from the essential features of novelty thereof which are intended to be secured and defined by the appended claims.

I claim as my invention:

1. A carousel pallet shuttle adapted for use with a plurality of pallet storage locations oriented in a circular arrangement, comprising a rotatable support member, a rectilinearly movable pallet shuttle member mounted on said rotatable support member for movement in an axial direction relative to said rotatable support member, said pallet shuttle member having a latch member adapted to releasably connect said pallet shuttle member with a pallet located at one of said pallet storage locations, and drive means for moving said pallet together with said pallet shuttle member onto said rotatable support member whereby said pallet is free to rotate past other pallet storage positions, said drive means comprising a drive member for selectively rectilinearly moving said pallet from said rotatable support member to a machining position in operative association with a machine tool and a lost motion linkage for automatically engaging said latch member, in response to motion of said drive member, before said pallet is pulled onto said rotatable support member, and for automatically disengaging said latch member, in response to motion of said drive member, after said pallet is moved off of said rotatable support member, said lost motion linkage comprising a rack and pinion linkage interconnected between said drive member and said latch member for rotating said latch member in response to rotation of said pinion, and spring means for preventing rotation of said pinion except when said drive member is in a fully extended condition.

2. Apparatus according to claim 1, including a plurality of ways supported in rigid relationship to said rotatable member for limiting motion of said drive screw nut in any direction transverse to said direction of rectilinear movement.

3. Apparatus according to claim 1, wherein said latch comprises a member having a C-shaped opening, each of said pallets having a T-shaped tongue fixed thereto, said T-shaped tongue being adapted to fit snugly into said C-shaped opening in said latch for allowing precise positioning of said pallet relative to said rotating shuttle, and for allowing said latch to be disengaged from said T-shaped tongue by moving the end of said latch in a direction transverse to the direction of said rectilinear movement.

4. Apparatus according to claim 1, including a plurality of ways mounted on said rotating shuttle for receiving said pallet and for maintaining the vertical elevation of said pallet in a precise plane.

5. A carousel pallet shuttle adapted for use with a plurality of pallet storage locations oriented in a circular arrangement, comprising a rotatable support member, a rectilinearly movable pallet shuttle member mounted on said rotatable support member for movement in an axial direction relative to said rotatable support member, said pallet shuttle member having a latch member adapted to releasably connect said pallet shuttle member with a pallet located at one of said pallet storage locations, and drive means for moving said pallet together with said pallet shuttle member onto said rotatable support member whereby said pallet is free to rotate past other pallet storage positions, said drive means selectively rectilinearly moving said pallet from said rotatable support member machining position in operative association with a machine tool, said drive means comprising a lost motion linkage for automatically engaging said latch member before said pallet is pulled onto said rotatable support member, and for automatically disengaging said latch member after said pallet is moved off of said rotatable member, said drive means comprising a drive screw and a drive screw nut threadably mounted thereon and adapted for rectilinear movement in response to the rotation of said drive screw, and said lost motion linkage comprising a housing member mounted for rectilinear sliding motion relative to said drive and said nut for mounting said latch member, and a spring member for normally maintaining a separation between a portion of said drive screw nut and said housing member.

6. Apparatus according to claim 5 wherein said latch member is connected with a gear mounted for rotation relative to said housing, and including a rack mounted on said drive screw nut for engaging said gear when said drive screw nut moves relative to said housing, thereby to rotate said gear and operate said latch.

7. A carousel pallet shuttle adapted for use with a plurality of pallet storge locations oriented in circular arrangement, comprising a rotatable support member, a rectilinearly movable pallet shuttle member mounted on said rotatable support member for movement in an axial direction relative to said rotatable support member, said pallet shuttle member having a latch member adapted to releasably connect said pallet shuttle member with a pallet located at one of said pallet storage locations, and drive means for moving said pallet together with said pallet shuttle member onto said rotatable support member whereby said pallet is free to rotate past other pallet storage positions, said drive means selectively rectilinearly moving said pallet from said rotatable support member to a machining position in operative association with a machine tool, said drive means comprising a lost motion linkage for automatically engaging said latch member before said pallet is pulled onto said rotatable support member, and for automatically disengaging said latch member after said pallet is moved off of said rotatable member, and position sensing means comprising a shaft having a pair of collars mounted thereon at spaced locations, and wherein said lost motion mechanism incorporates a flange member adapted to engage one of said collars and move said shaft rectilinearly in the direction of motion of said collar, a cam member mounted on said shaft for movement therewith, a cam follower mounted in fixed relation and adapted to be engaged by said cam as said shaft moves, and a switch actuated by said cam follower to generate a signal indicative of movement of said shaft.

8. Apparatus of claim 7, including a plurality of cams mounted on said shaft, in closely spaced relationship to each other, said cam follower being mounted in fixed relationship to said rotatable member for engagement with said cams in response to the movement of said shaft, and a plurality of switches operated by said cam follower, for generating signals indicative of three different positions of said shaft.

9. Apparatus according to claim 7, including spring means for normally biasing said shaft to a central position when said engaging portion of said drive screw nut is not contacting either of said collars, and for biasing said shaft toward said central position when said engaging portion of said drive screw nut moves said shaft from said central position.

* * * * *